UNITED STATES PATENT OFFICE.

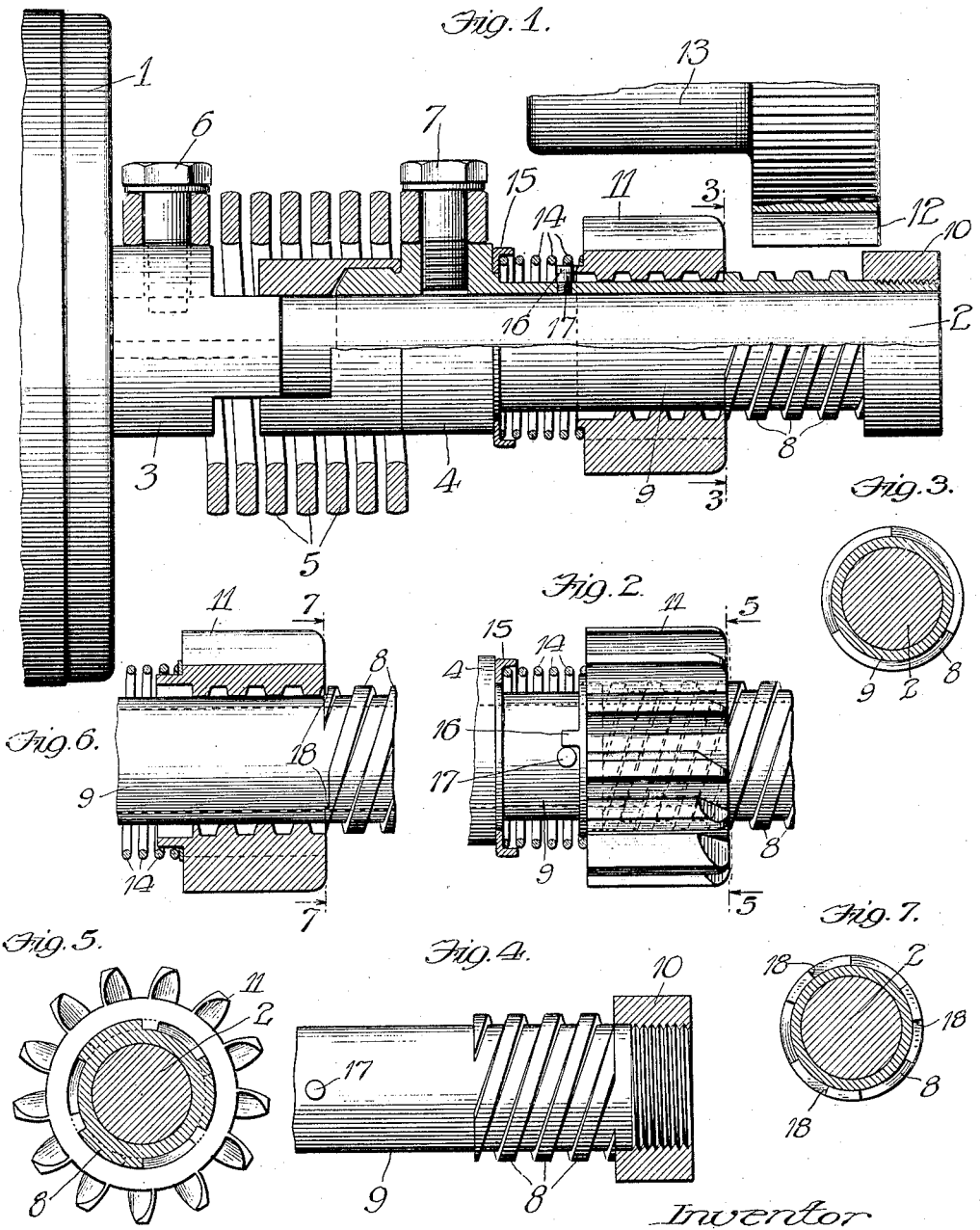

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

ENGINE-STARTER.

1,401,170.      Specification of Letters Patent.      Patented Dec. 27, 1921.

Application filed October 20, 1920. Serial No. 418,265.

*To all whom it may concern:*

Be it known that I, WILLIAM L. McGRATH, a citizen of the United States, residing at Elmira, in the county of Chemung and State of New York, have invented certain new and useful Improvements in Engine-Starters, of which the following is a specification.

My invention relates to an engine starter and the object thereof is to produce a simple and novel form of construction of the drive or transmission thereof. Speaking in general terms my drive or transmission comprises a rotatable driving member or screw shaft which has a screw threaded portion and a plain portion and a driving member such as a pinion adapted to engage the engine member such as its flywheel and normally positioned on the plain portion of the shaft but adapted to be engaged with the screw threads thereof when such shaft is rotated. The various features of advantage and utility in construction and mode of operation of my new drive will be apparent from the description hereinafter given.

In the drawings Figure 1 is a sectional elevation of a starter system illustrating my drive; Fig. 2 a detail elevation partly in section illustrating a certain detail as to pinion and shaft; Fig. 3 a cross section on the line 3—3 of Fig. 1; Fig. 4 an elevation of a portion of the screw shaft alone but with the stop nut in section; Fig. 5 a detail on the line 5—5 of Fig. 2; Fig. 6 a section illustrating a modified form; and Fig. 7 a section on line 7—7 of Fig. 6.

Without intention of limitation thereto I have illustrated my invention as incorporated with the structure of the Eclipse-Bendix drive although it will be understood that my invention may be embodied in other forms of construction, and is not to be limited to specific features of said drive. It will also be understood that while I have herein illustrated the so-called outboard type of drive the same is equally applicable to the inboard type. Also it will be understood that while I have shown my invention embodied in the single reduction type it is equally applicable to the double reduction type in which reduction gearing is employed between the starting motor and the driving shaft of the drive.

Referring to the particular embodiment as herein shown, the prime mover such as the electric motor indicated at 1 is provided with an extended armature shaft 2 upon whose inner end is secured a collar 3 forming a driving head. A screw shaft in the form of a sleeve is mounted upon the shaft 2 and provided with a driven head 4. This head has a yielding driving connection with the head 3 through the drive spring 5 anchored at its opposite ends to said heads respectively by means of the studs 6 and 7. The screw shaft has a screw threaded portion 8 and a plain portion 9, such screw threaded portion being in the present instance toward the outer end of the shaft. This shaft is provided at its extreme outer end with the usual stop nut 10.

The driving member is here in the form of a pinion 11 which is adapted to mesh with the teeth 12 of the engine member which is here the flywheel 13 of such engine. This pinion has a screw threaded central bore adapted to engage with the screw threads of the screw shaft when such shaft is rotated, whereupon the pinion is caused to advance longitudinally of the shaft and into mesh with the flywheel until such movement is arrested by the stop whereupon it will partake of the rotary movements of the shaft and thereby rotate the flywheel. This pinion is normally positioned upon the plain portion 9 of the screw shaft as shown in Fig. 1 but the entering or engaging points of the pinion and the screw threaded portion of the shaft are adapted to engage when such shaft is rotated.

The pinion is yieldingly pressed outwardly toward the right (Fig. 1) and against the screw threaded portion of the shaft by means of the light coiled spring 14 bearing at one end against the body of the pinion and at the other end against the retainer cup 15 bearing against the outer face of the driven head 4. In order to prevent any possibility of engagement of the pinion with the screw threads at a time when the starter is not being operated, such as might occur from the drifting movement of the pinion due to vibration, I provide means whereby such engagement is prevented unless the screw shaft is positively operated by the motor.

Referring to Figs. 1, 2 and 4, the pinion 11 is provided with an inwardly extending projection or lug 16 in whose path of movement when being returned to normal position and at the end of such movement, is located a projection on the screw shaft which is here in the form of a radial pin 17 in such shaft. This lug and pin are so related with respect to the engaging points of the screw threads of the pinion and shaft respectively that when the pinion comes to rest in its normal position with the lug and pin in engagement as seen in Fig. 2, these engaging points are out of register with each other so that the pinion is pressed by the spring against the ends of the screw threads 8 but not into threaded engagement therewith. However, just as soon as the screw shaft is rotated a set (that is three in the present instance because of the triple threads used) of engaging points or screw thread openings will be presented to a corresponding set of screw threads in the pinion and by reason of the rotation of the screw shaft the pinion will be advanced longitudinally and into mesh with the flywheel gear.

Fig. 6 represents a modified form of construction according to which the pinion is held in non-registered position as to engaging points of the screw threads by means of a peculiar formation of the ends of the threads of the screw shaft. As shown in Figs. 6 and 7 the ends of these threads are cut in such manner as to form shelves or shoulders 18 against which the engaging ends of the threads of the pinion contact and are prevented from further partial rotation such as would bring the engaging points of the threads of the pinion and screw shaft into actual screw threaded engagement.

I claim:

1. An engine starter drive including a rotatable shaft having a screw-threaded portion and a plain portion, and a driving member having a bore with a screw thread, such member being normally positioned on the plain portion of the shaft with its screw threads adjacent the screw-threaded portion but out of register therewith and adapted to engage threads when the shaft is rotated.

2. An engine starter drive including a rotatable shaft having a screw-threaded portion and a plain portion, and a driving member having a bore with a screw thread, such member being normally positioned on the plain portion of the shaft with its screw threads adjacent the screw-threaded portion but out of register therewith and adapted to engage threads when the shaft is rotated, said member being held against such screw-threaded portion with a yielding pressure.

3. An engine starter drive including a rotatable shaft having a screw-threaded portion and a plain portion, and a driving member having a bore with a screw thread, such member being normally positioned on the plain portion of the shaft with its screw threads adjacent the screw-threaded portion but out of register therewith and adapted to engage threads when the shaft is rotated, and a light spring for holding said member against such screw-threaded portion with a yielding pressure.

4. An engine starter drive including a rotatable shaft having a screw-threaded portion and a plain portion, and a driving member having a bore with a screw thread, such member being normally positioned on the plain portion of the shaft with its screw threads adjacent the screw-threaded portion and adapted to engage threads when the shaft is rotated, and means for preventing engagement of the screw threads of said member and shaft unless the latter is rotated positively.

5. An engine starter drive including a rotatable shaft having a screw-threaded portion and a plain portion, and a driving member having a bore with a screw thread, such member being normally positioned on the plain portion of the shaft with its screw threads adjacent the screw-threaded portion and adapted to engage threads when the shaft is rotated, and means for positioning said member when in normal position on the shaft so that the engaging points of the member and screw-threaded portion of the shaft shall be out of register.

6. An engine starter drive including a rotatable shaft having a screw-threaded portion and a plain portion, and a driving member having a bore with a screw thread, such member being normally positioned on the plain portion of the shaft with its screw threads adjacent the screw-threaded portion and adapted to engage threads when the shaft is rotated, and means for positioning said member when in normal position on the shaft so that the engaging points of the member and screw-threaded portion of the shaft shall be out of register, such means consisting of engaging stop members on the said driving member and shaft respectively.

WILLIAM L. McGRATH.